(12) United States Patent
Layne et al.

(10) Patent No.: US 9,656,810 B1
(45) Date of Patent: May 23, 2017

(54) TILTED CONVEYOR SYSTEMS AND RELATED METHODS

(71) Applicant: Span Tech LLC, Glasgow, KY (US)

(72) Inventors: James L. Layne, Bowling Green, KY (US); Scott Dayton Barbour, Glasgow, KY (US)

(73) Assignee: SPAN TECH LLC, Glasgow, KY (US)

( * ) Notice: Subject to any disclaimer, the term of this patent is extended or adjusted under 35 U.S.C. 154(b) by 0 days.

(21) Appl. No.: 14/611,909

(22) Filed: Feb. 2, 2015

Related U.S. Application Data

(60) Provisional application No. 61/935,612, filed on Feb. 4, 2014.

(51) Int. Cl.
| | | |
|---|---|---|
| *B65G 47/94* | (2006.01) | |
| *B65G 47/00* | (2006.01) | |
| *B65G 15/02* | (2006.01) | |
| *B65G 15/30* | (2006.01) | |
| *B65G 21/20* | (2006.01) | |
| *B65G 15/28* | (2006.01) | |

(52) U.S. Cl.
CPC ......... *B65G 21/2072* (2013.01); *B65G 15/02* (2013.01); *B65G 15/28* (2013.01); *B65G 15/30* (2013.01)

(58) Field of Classification Search
None
See application file for complete search history.

(56) References Cited

U.S. PATENT DOCUMENTS

| | | | |
|---|---|---|---|
| 3,147,845 A | 9/1964 | Harrison et al. | |
| 3,637,066 A | 1/1972 | Idskov et al. | |
| 3,718,249 A | 2/1973 | Hess | |
| 4,031,998 A | 6/1977 | Suzuki et al. | |
| 5,244,074 A | 9/1993 | Riemrich | |
| 5,990,437 A * | 11/1999 | Coutant | B65G 47/965 198/349.95 |
| 6,135,262 A | 10/2000 | Poelling | |
| 6,193,074 B1 | 2/2001 | Baum et al. | |
| 6,196,375 B1 | 3/2001 | Cozza | |
| RE37,747 E * | 6/2002 | van den Goor | B65G 17/385 198/370.04 |
| 6,502,687 B1 | 1/2003 | Ayen et al. | |
| 6,827,198 B1 | 12/2004 | Costanzo | |
| 6,923,309 B2 | 8/2005 | Costanzo | |
| 6,991,086 B2 | 1/2006 | Ledingham | |
| 7,004,301 B2 | 2/2006 | Brixius et al. | |
| 7,637,368 B2 | 12/2009 | Andreoli | |
| 7,850,000 B2 | 12/2010 | Andreoli | |
| 8,393,458 B2 | 3/2013 | Kaes et al. | |

* cited by examiner

*Primary Examiner* — Kavel Singh
(74) *Attorney, Agent, or Firm* — King & Schickli, PLLC

(57) ABSTRACT

A conveyor system is for intended use in conjunction with the conveyance of articles, such as for being sorted for downstream processing. The system comprises a conveyor, which may be an endless conveyor including a forward run and a return run. The conveyor may have a tilted conveying surface for supporting the articles being conveyed. A low friction guide extends along the conveyor for engaging the articles being conveyed by the conveyor, which may include rollers for providing rolling contact for the articles during conveyance. Related methods are also disclosed.

19 Claims, 11 Drawing Sheets

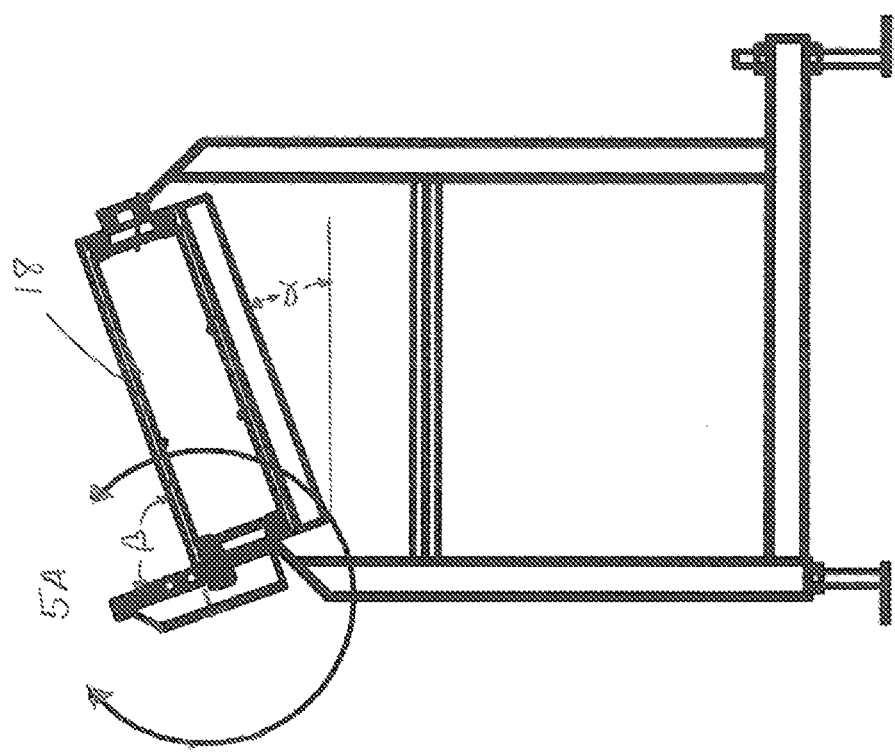

TILTED CONVEYOR SYSTEMS AND RELATED METHODS

This application claims the benefit of U.S. Provisional Patent Application Ser. No. 61/935,612, the disclosure of which is incorporated herein by reference, along with all other documents referenced herein.

TECHNICAL FIELD

This disclosure relates to the article conveying arts and, in particular, to a system including conveyors for conveying articles.

BACKGROUND OF THE INVENTION

Over the past several years, the demand from businesses and individuals alike for second day and even overnight deliveries of articles, such as small to mid-sized parcels, packages and letters, has steadily increased. This demand is due, in part, to the prevalence of Internet and mail order shopping, which creates a similar need for an efficient and effective distribution system to deliver the wares expediently. Consequently, the need for methods and systems for quickly transporting, sorting and distributing this ever increasing volume of articles has similarly increased.

Accordingly, a need is identified for a conveyor system for use in delivering articles in an efficient manner.

SUMMARY

A conveyor system for intended use in conjunction with the conveying of articles is disclosed. The system in one aspect comprises a conveyor having a tilted conveying surface for supporting the articles being conveyed. A guide extends along the conveyor for engaging the articles being conveyed by the conveyor, and includes at least one roller for providing low-friction rolling contact for the articles being conveyed by the conveyor.

The conveyor may comprise a curve including the tilted conveying surface. The guide may comprise a plurality of rollers, which may be adapted for rotating in a conveying direction and a direction transverse to the conveying direction. The guide may extend generally orthogonal to a conveying surface of the conveyor, and may be tilted relative to a vertical axis.

The conveyor may comprise a conveyor belt comprising a plurality of rollers. The belt may be an endless conveyor belt including a forward run and a return run. A brake may be provided for halting articles being conveyed by the conveyor.

The disclosure also pertains to a conveyor system for intended use in conjunction with the conveying of articles. The conveyor may comprise an endless conveyor having a forward run and a return run, the forward run including a tilted conveying surface for supporting the articles being conveyed. A guide extending along at least a portion of the forward run of the conveyor serves to engage the articles being conveyed by the conveyor.

In one embodiment, the guide comprises a plurality of rollers. The guide may be tilted relative to a vertical axis. The conveyor may be at least partially curved, and may comprise a belt including a plurality of rollers forming part of the conveying surface. A brake for halting articles being conveyed by the conveyor may also be provided.

A further aspect of the disclosure pertains to a conveyor system for intended use in conjunction with the conveyance of articles. The system comprises a conveyor having a conveying surface for supporting the articles being conveyed. A guide extending along the conveyor is for engaging the articles being conveyed by the conveyor. The guide comprises a belt including a plurality of interdigitated links interconnected by a connector, the connector supporting at least one roller for providing low friction rolling contact for the articles being conveyed.

The roller may be adapted for rotating in a conveying direction and a direction transverse to the conveying direction. A brake may be provided for halting one or more of the articles being conveyed by the conveyor.

A further aspect of the disclosure relates to a method of conveying articles by providing a guide rail including at least one roller for guiding the article along a tilted, curved section of a conveyor. The method may further include halting the conveyance of the article on the conveyor while a conveyor belt supporting the article continues to move in a conveying direction.

BRIEF DESCRIPTION OF THE DRAWINGS

FIG. 5 is a cross-sectional view of the conveyor system of FIG. 4, taken along line 5-5;

DETAILED DESCRIPTION

Figure 1:
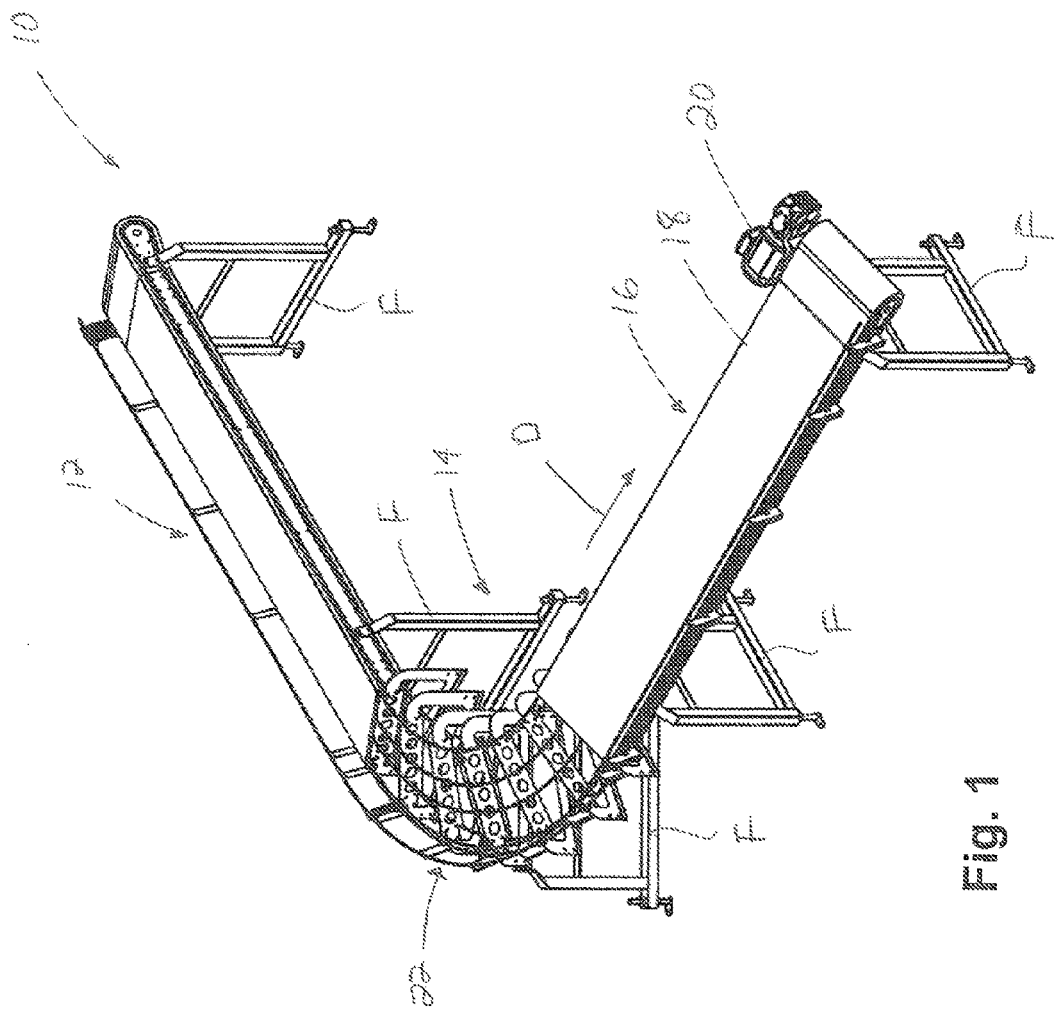
FIG. 1 is a perspective view of a conveyor system forming one aspect of the disclosure.

With reference to FIGS. 1-5, one possible embodiment of a conveyor system 10 forming one aspect of the invention is schematically illustrated. As illustrated, the system 10 may include an infeed conveyor 12 for feeding articles to an intermediate conveyor 14, which in turn delivers the articles to an outfeed conveyor 16, all in a conveying direction D and in a continuous path. The conveyors 12, 14, 16 may be supported above the ground by a system of frames F, as is customary.

Figure 2:
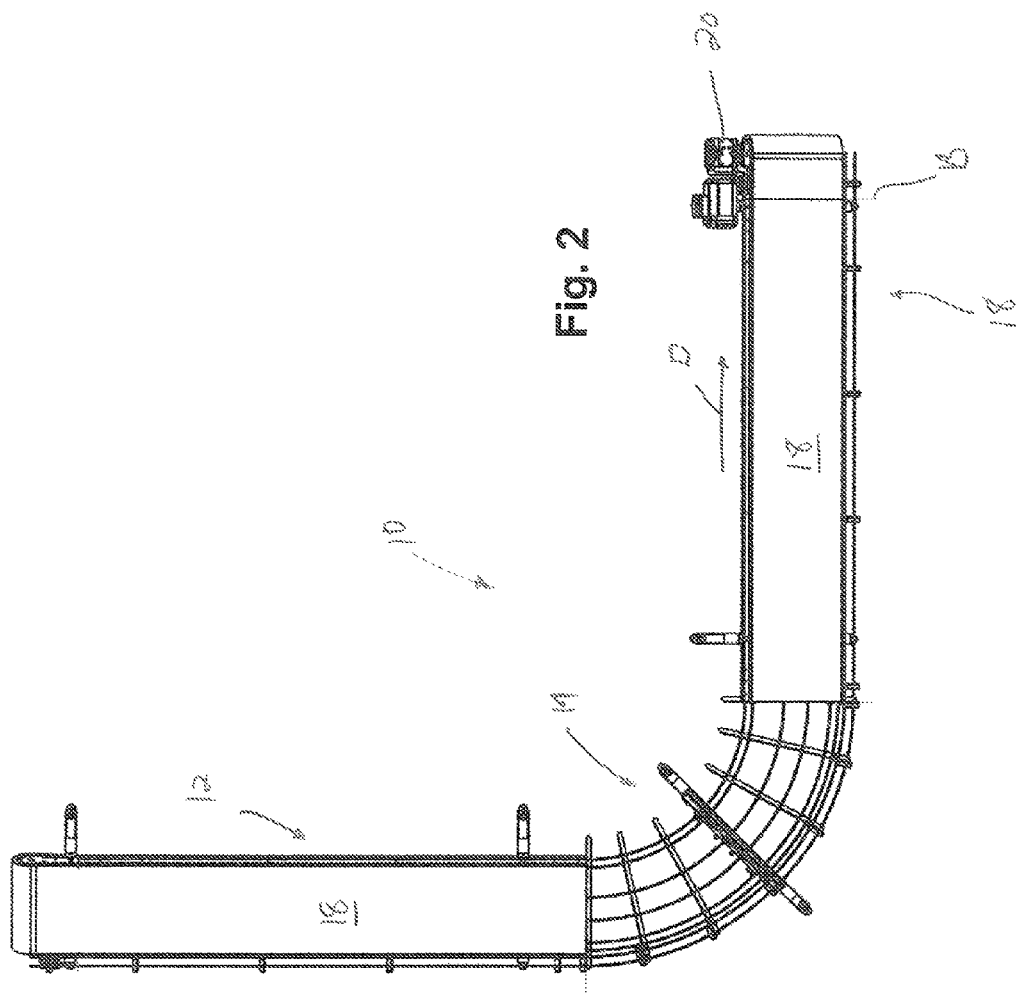
FIG. 2 is a top view of the conveyor system of FIG. 1.
Figure 3:
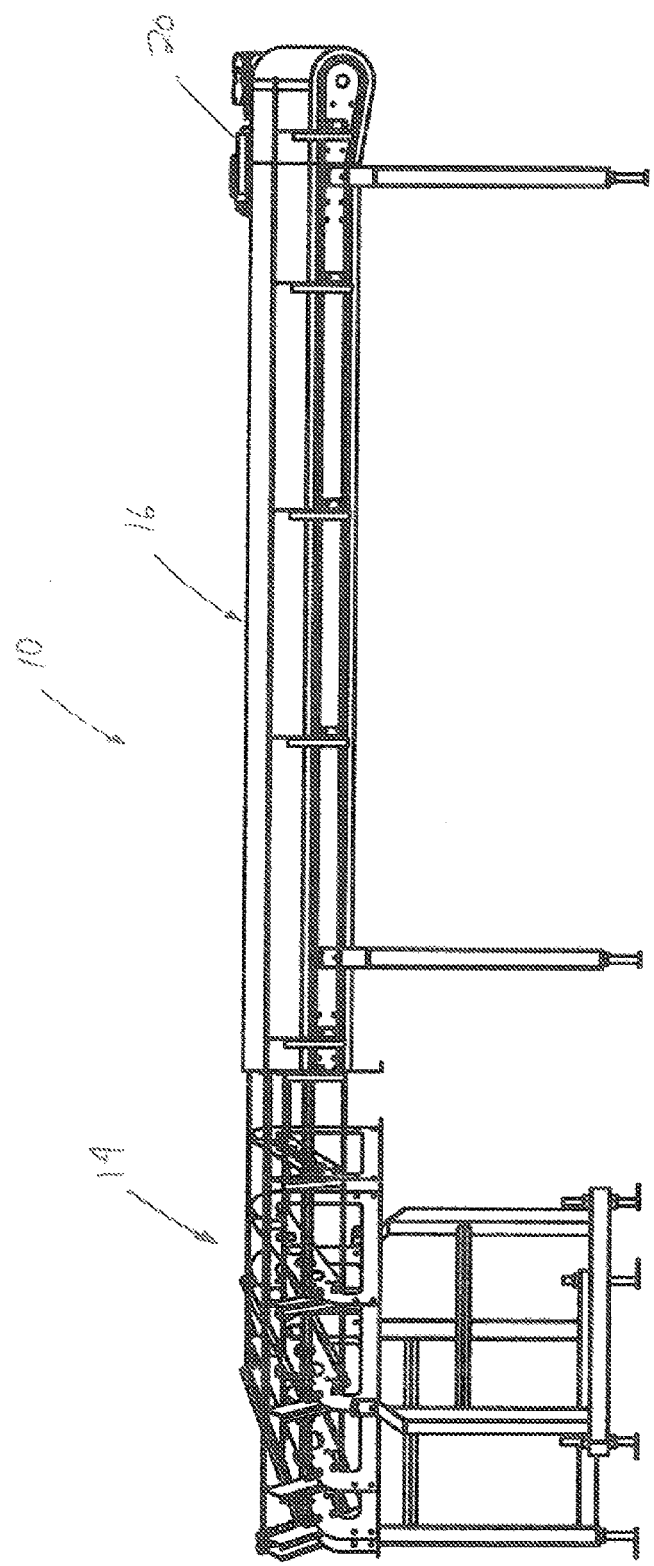
FIG. 3 is a rear view of the conveyor system of FIG. 1.
Figure 4:
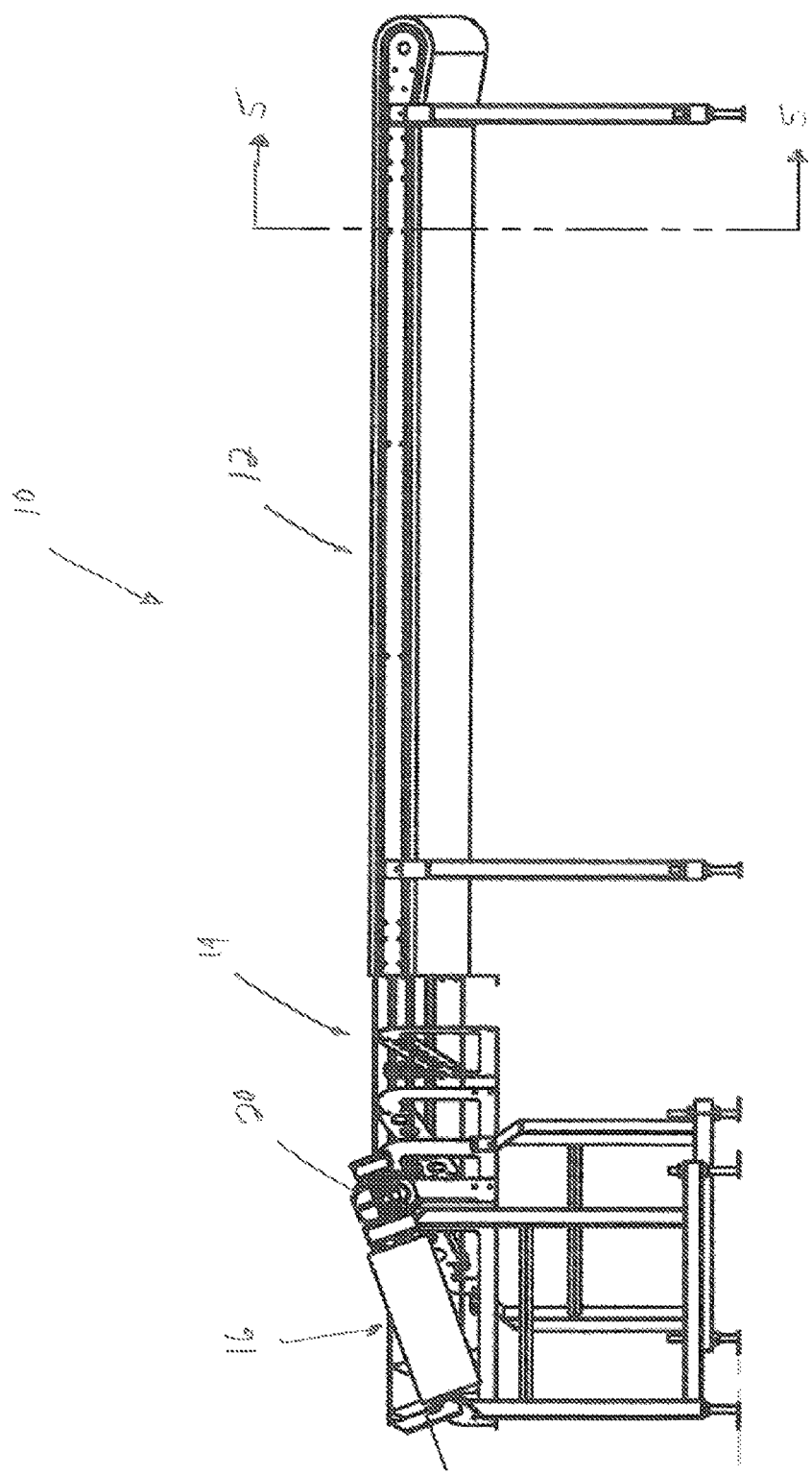
FIG. 4 is a front view of the conveyor system of FIG. 1.

Any one or all of the conveyors 12, 14, 16 may be titled relative to the horizontal plane, as perhaps best understood with reference to FIG. 2. In one embodiment, all three conveyors 12, 14, 16 are tilted or otherwise arranged to provide a tilted conveying surface for the articles being conveyed. The tilting may be between about 0 and 90 degrees relative to the horizontal. In one example, the tilting is about 20 degrees relative to the horizontal (see angle α in FIG. 5), but may vary depending on the requirements of a particular application (or along different portions of the system 10). As a result, articles tend to slide along the surface of the conveyors 12, 14, 16 to the lowest point during conveyance, which in the illustrated embodiment is along the outer side of the conveyor system 10.

One or more of the conveyors 12, 14, 16 forming part of the system 10 may also be curved. In the illustrated embodiment, the intermediate conveyor 14 is curved and also tilted, thus forming a conical conveying surface. The curve is shown as a 90 degree bend for purposes of illustration. A curve of anywhere from 1-180 degrees may be possible in the same plane (or up to 360 degrees with a change in elevation), and more than one of the conveyors or conveyor segments may be curved. The selected arrangement will ultimately depend on the particular application.

Each conveyor 12, 14, 16 may be of the endless belt or chain type, and thus provides a substantially continuous conveying surface for articles being conveyed. In the illustrated embodiment, the conveyors 12, 14, 16 all form part of a single conveyor, and thus use a single, endless belt or chain 18, which may be driven by a motor 20 along an endless path between a forward (upper) run presenting the conveying surface for conveying articles and a return (lower) run for returning the belt to the forward run. However, discrete conveyors may also be used with suitable transfers for positioning at the gaps. Although certainly not a requirement, the types of endless belt or chain conveyors distributed by Span Tech, LLC under THE DESIGNER SYSTEM trademark, may be used (the details of which are found in U.S. Pat. Nos. 4,953,693 and 5,031,757 (which are incorporated herein by reference)). A single, side-flexing belt may extend along all three conveyors 12, 14, 16 in an endless fashion, or discrete belts may be used with suitable transfers (not shown).

To accommodate the article movement along the conveyors 12, 14, 16 as a result of the tilting, a guide 22 is provided for assisting in guiding the articles being conveyed by the belt 18. In the illustrated embodiment, the guide 22 is positioned adjacent to the lower end of each conveyor 12, 14, 16, which as noted above is tilted so that this lower end is along the outer side (but it could be the opposite arrangement, or a combination of the two along different portions of the conveyors 12, 14, 16). Hence, in combination with the tilted conveying surface of the belt 18, the side guide 22 engages and provides support for the articles being conveyed, retaining them in a known orientation and position during conveyance. The guide 22 may itself be tilted, as illustrated, and may complement the tilting of the associated conveyor 12, 14, 16 such that a 90 degree angle is formed (see angle β in FIG. 5) between the respective conveying surfaces (one of which may be considered passive, and the other active).

This guide 22 may provide enhanced low friction rolling contact for the articles being conveyed by the associated conveyors 12, 14, 16, such as in a passive manner. This may be achieved by incorporating one or more rollers into the guide 22. The rollers should be oriented for rotation at least about a vertical axis generally orthogonal to the conveying direction D.

Figure 5A:
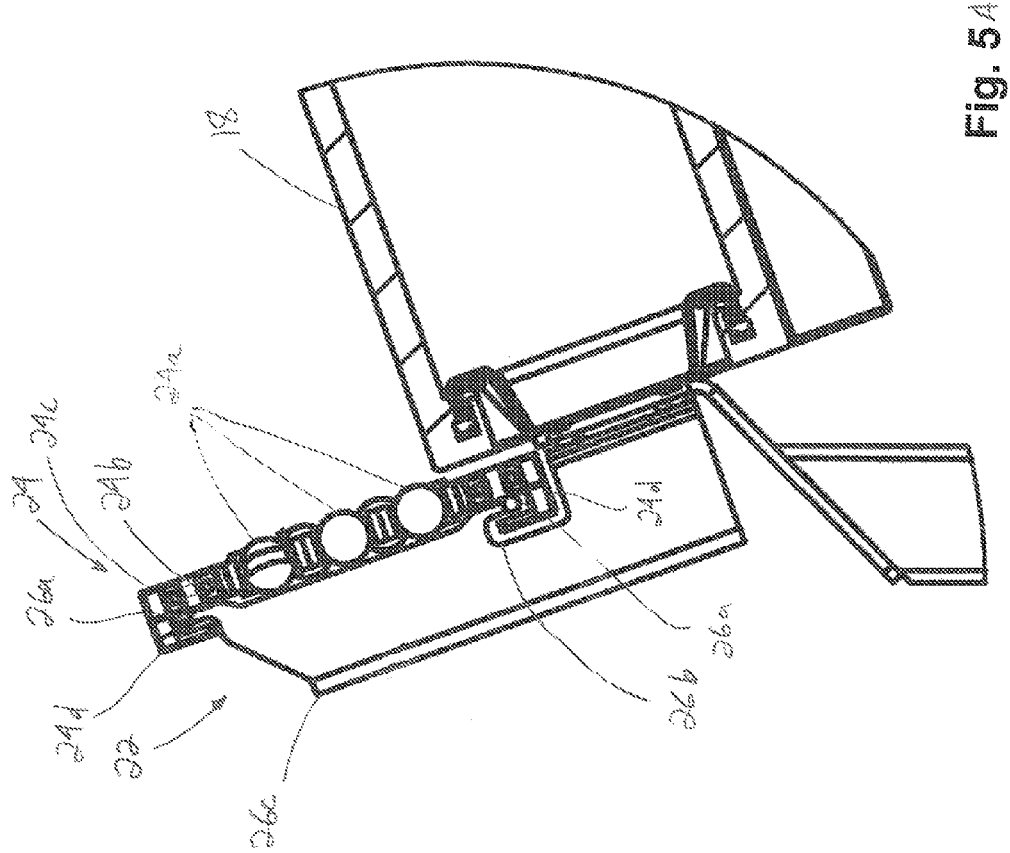
FIG. 5A is a partially cutaway, partially cross-sectional view associated with line 5A in FIG. 5.
Figure 5B:
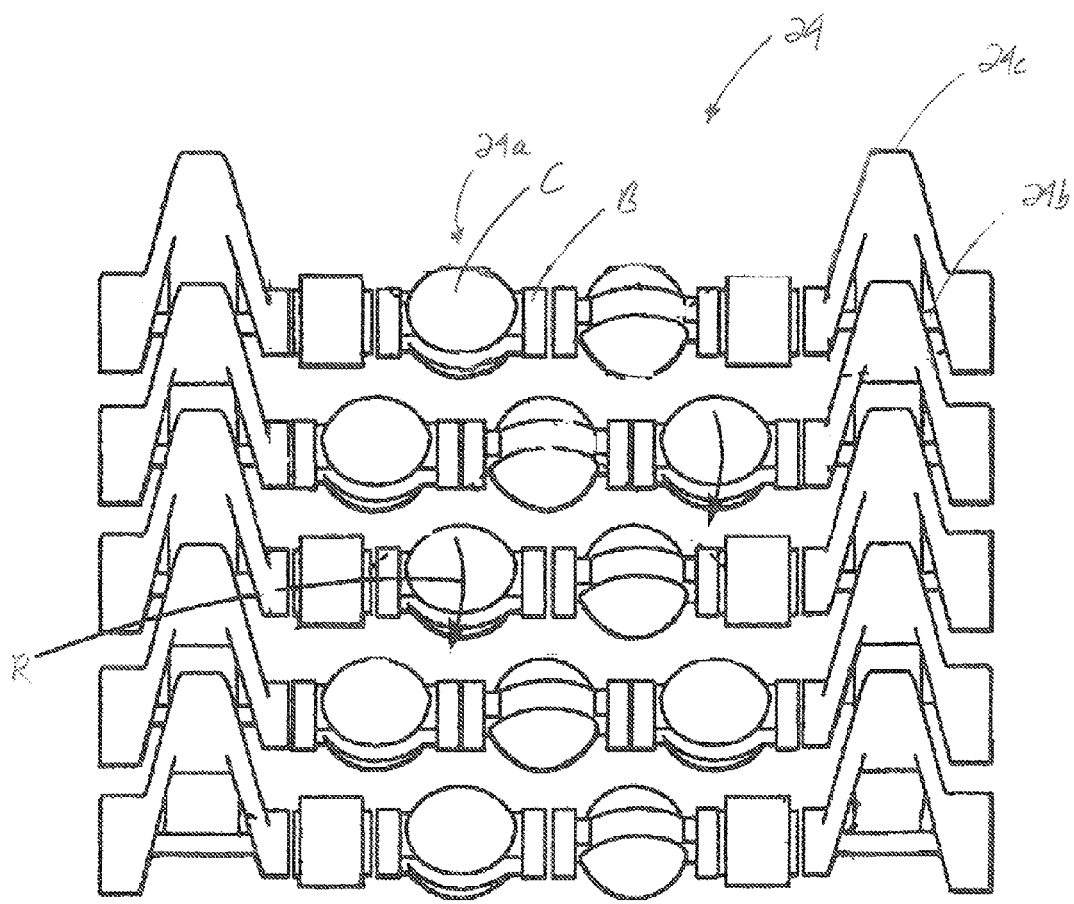
FIG. 5B is a partially cutaway, enlarged plan view of a section of the guide rail shown in FIG. 5A.

A particular form of guide 22 designed for multi-directional rotation may be used, as shown in FIG. 5A, and may comprise a chain 24 fixedly mounted to a frame 26 so as to extend along the conveyor 14 (or conveyors 12 or 16) with independent rollers 24a (which may be in the form of hemispherical caps C rotatably secured to a rotatable base element B capable of rotating; see arrow R in FIG. 5B). The rollers 24a may be supported by a connector 24b serving to connect interdigitated links 24c. The rollers 24a are thus adapted for rotating in the conveying direction D, as well as a direction transverse to the conveying direction by virtue of the rotatable caps C, which are optional. The details of such a roller chain 24 may be found in U.S. Pat. No. 6,874,617, the disclosure of which is incorporated herein by reference.

As the chain 24 forming part of the guide 22 also includes interdigitated links 24c (from adjacent rows, for example), it is capable of freely flexing from side to side when oriented vertically. This allows for the chain 24 to assume freely the shape necessary as the conveyor transitions from a straight portion, such as provided by conveyor 12, to the curved portion, such as provided by conveyor 14, and then back again (conveyor 16). Consequently, a continuous, flexible guide 22 is thus provided that is easy to install or replace by simply sliding the chain 24 along an underlying support frame 26, which may comprise continuously extending rails 26a for supporting the chain 24 in a substantially vertical, but tilted orientation (such as by the depending arms 24d associated with the links 24c along the lateral sides of the chain 24). A corresponding passage 26b may be provided in an associated support 26c forming part of the frame 26 for receiving part of the chain 24.

Figure 6:
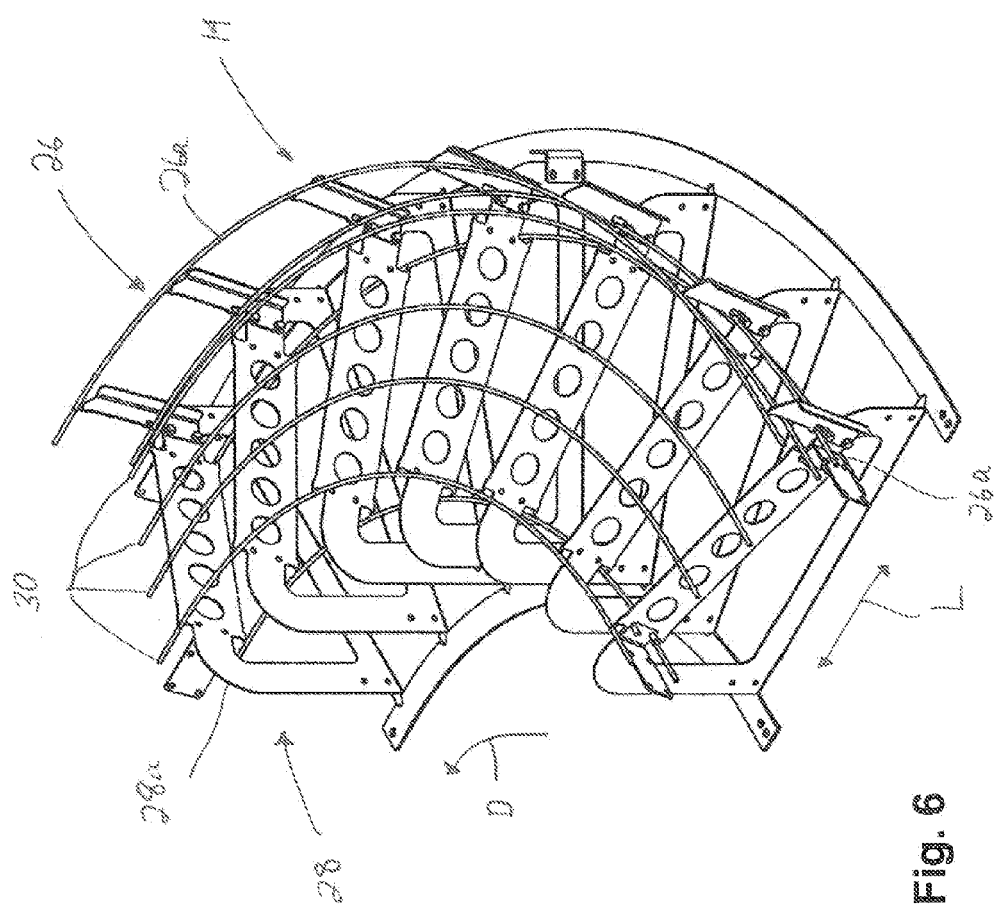
FIG. 6 is a perspective view of a support frame associated with the conveyor system.
Figure 7:
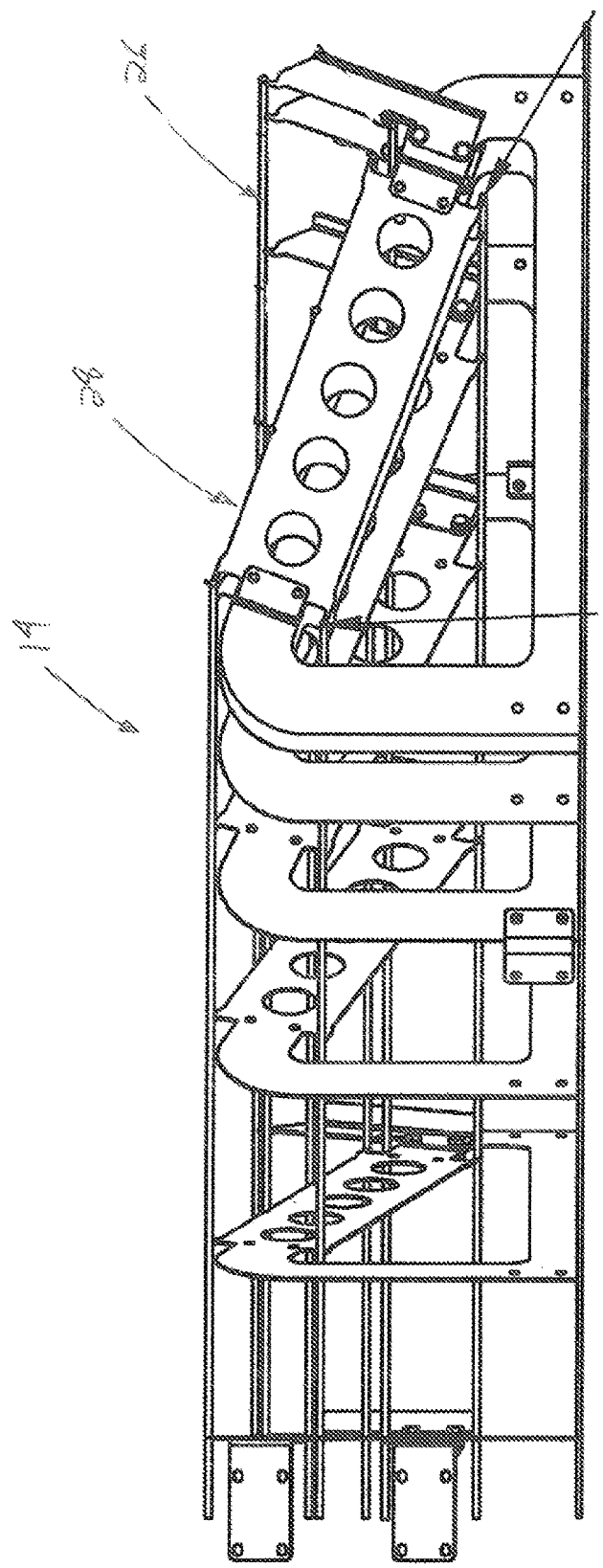
FIG. 7 is a front view of the support frame of FIG. 6.
Figure 8:
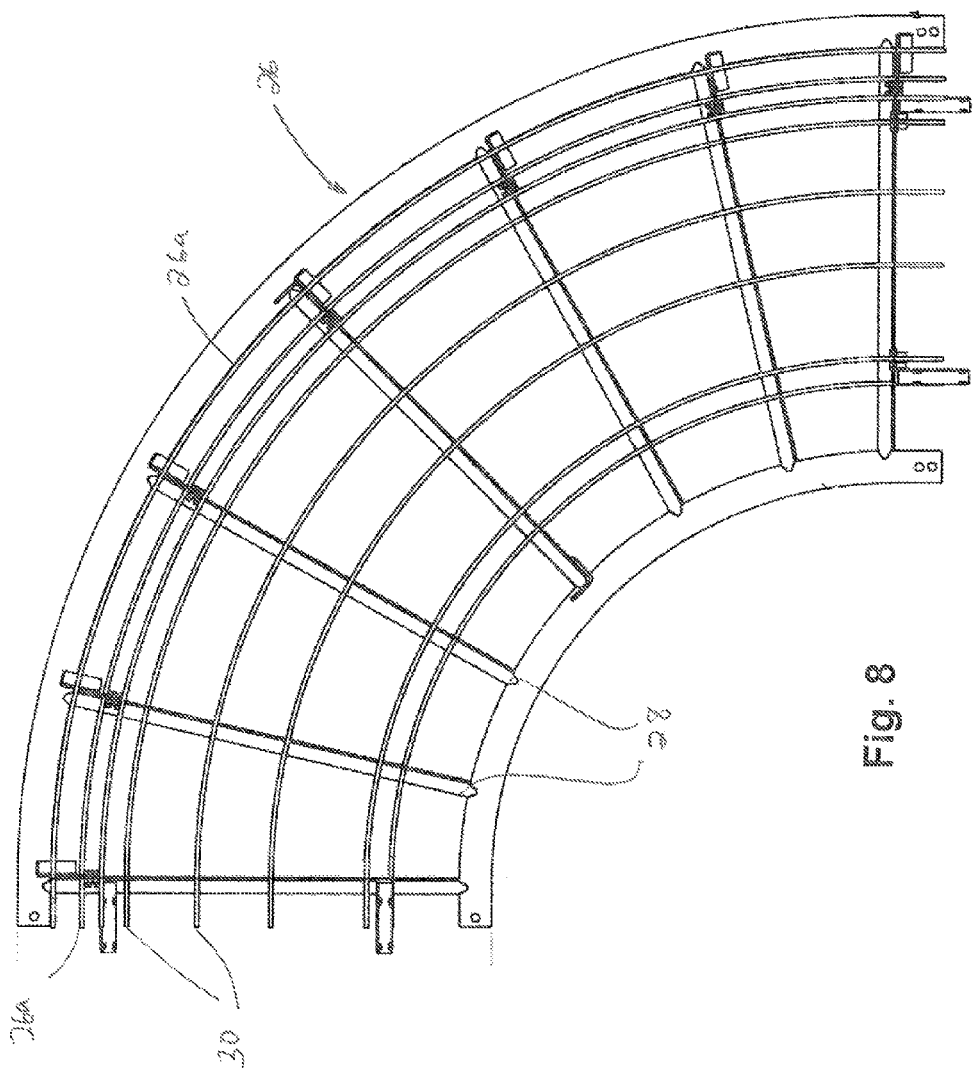
FIG. 8 is a top view of the support frame of FIG. 6.
Figure 9:
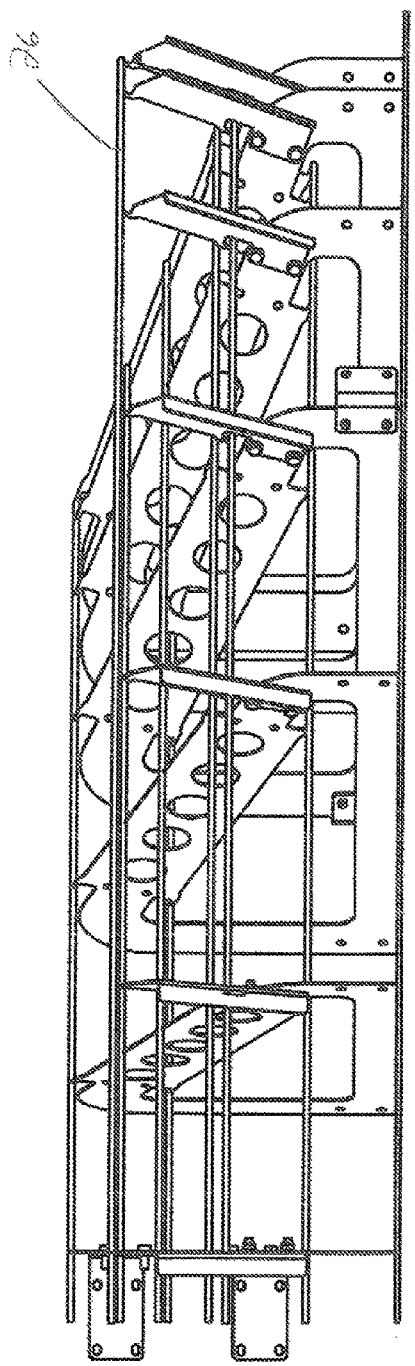
FIG. 9 is a rear view of the support frame of FIG. 6.

Referring now to FIG. 6, a particular construction of the curved intermediate section 14 is shown. The frame 26 for this section comprises a plurality of radially extending supports 28 spaced apart in the conveying direction D. The supports 28 have an upper part 28a, which may be adjacent to the inside of the curve, and a lower part 28b, which may be adjacent to the outside of the curve. The supports 28 may be generally triangular in shape, and may also provide support for the guide rail 26 (which is oriented generally orthogonally to create an L-shaped structure).

Connectors 30 for supporting the conveyor chain 18 along the endless path may interconnect the supports 28. The connectors 30 may comprise elongated rods that are curved in the conveying direction D. As can be appreciated, the connectors 30 will have different elevations depending on their positioning along the supports 28 in the radial direction L.

Figure 10:
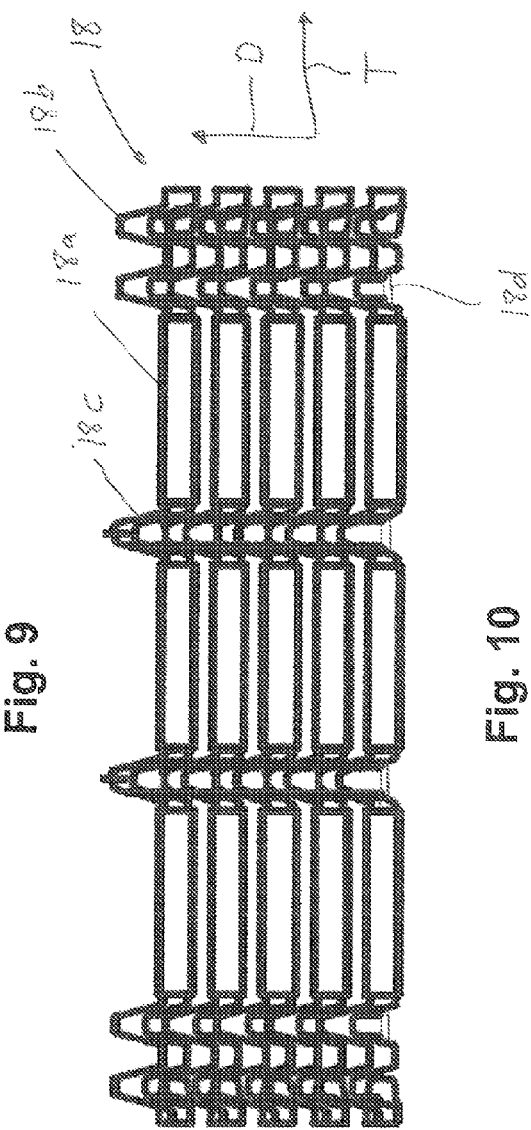
FIG. 10 is a top view of a section of a roller chain that may be used as a belt in connection with the conveyor system.

Turning to FIG. 10, in one possible embodiment, the belt 18 used in connection with the conveyors 12, 14, 16 may be roller chain, which includes a plurality of rolling elements or rollers 18a spaced apart both in the conveying direction D and in the transverse direction T. The belt 18 may further comprise side guide links 18b, intermediate links 18c, and connectors 18d. As can be appreciated, the connectors 18d not only serve to interconnect the links 18b, 18c, but also provide rotational support for the roller or rollers 18a associated with a corresponding row of links. The arrangement may be such that the belt 18 is also capable of side flexing in order to negotiate a lateral curve or bend, such as the curved intermediate conveyor 14 forming part of the conveyor system 10.

As can be appreciated, these rolling elements 18a may support and convey the articles in a known orientation as the belt 18 is driven. However, when one of the articles is stopped, such as by a brake associated with the conveyor (such as an arm extending into the conveying path (see brake B in FIG. 2), or an associated braking conveyor, such as one having a high friction surface positioned downstream of conveyor 16 in the conveying direction D), the underlying belt 18 may continue to move along the endless path while the article(s) remain stationary, including in engagement with the guide 22 (the associated rollers 24a of which would be stationary while the articles are halted). Any subsequent articles are thus accumulated behind the stationary article (which thus serves as an obstacle in the conveying path), in a known orientation as a result of the titled nature of the conveyors 12, 14, 16 and the associated guide 22. Removing the brake B would thus allow for the continued conveyance of the articles, which may of course be halted again as desired to allow for a downstream processing operation to occur.

Having shown and described various embodiments, further adaptations of the apparatuses, methods and systems described herein may be accomplished by appropriate modifications by one of ordinary skill in the art without departing from the scope of the disclosure. Several of such potential modifications have been mentioned, and others will be apparent to those skilled in the art. For instance, the examples, embodiments, geometries, materials, dimensions, ratios, steps, and the like discussed above are illustrative and are not required. The term "conveyor" as used herein means something that conveys, and is not meant to connote a singular device or structure. Accordingly, the scope of the disclosure should be considered in terms of claims that may be presented, and is understood not to be limited to the details of structure and operation shown and described in the specification and drawings.

The invention claimed is:

1. A conveyor system for intended use in conveying articles, comprising:
    a conveyor having a tilted conveying surface for supporting the articles during conveyance and
    a guide extending along the conveyor for engaging the articles during conveyance by the conveyor, the guide comprising at least one roller for providing low-friction rolling contact to the articles being conveyed by the conveyor.

2. The conveyor system of claim 1, wherein the conveyor comprises a curve including the tilted conveying surface.

3. The conveyor system of claim 1, wherein the guide comprises a plurality of rollers.

4. The conveyor system of claim 3, wherein the rollers are adapted for rotating in a conveying direction and a direction transverse to the conveying direction.

5. The conveyor system of claim 1, wherein the guide extends generally orthogonal to the tilted conveying surface of the conveyor.

6. The conveyor system of claim 1, wherein the guide is tilted relative to a vertical axis.

7. The conveyor system of claim 1, wherein the conveyor includes a conveyor belt comprising a plurality of rollers.

8. The conveyor system of claim 1, wherein the conveyor comprises an endless conveyor belt including a forward run and a return run.

9. The conveyor system of claim 1, further including a brake for halting articles being conveyed by the conveyor.

10. A conveyor system for intended use for conveying articles, comprising:
    an endless conveyor having a forward run and a return run, the forward run including a tilted conveying surface for supporting the articles during conveyance; and
    a guide extending along at least a portion of the forward run of the conveyor for engaging the articles during conveyance, wherein the guide comprises a plurality of rollers for providing low-friction rolling contact to the articles being conveyed by the conveyor.

11. The conveyor system of claim 10, wherein the guide is tilted relative to a vertical axis.

12. The conveyor system of claim 10, wherein the conveyor is at least partially curved.

13. The conveyor system of claim 10, wherein the conveyor comprises a belt including the plurality of rollers forming part of the conveying surface.

14. The conveyor system of claim 10, further including a brake for halting articles being conveyed by the conveyor.

15. A conveyor system for intended use for conveying articles, comprising:
    a conveyor having a conveying surface for supporting the articles during conveyance; and
    a guide extending along the conveyor for engaging the articles during conveyance, the guide comprising a belt including a plurality of links interconnected by a connector, the connector supporting at least one roller for providing low friction rolling contact to the articles being conveyed.

16. The conveyor system of claim 15, wherein the roller is adapted for rotating in a conveying direction and a direction transverse to the conveying direction.

17. The conveyor system of claim 15, further including a brake for halting one or more of the articles being conveyed by the conveyor.

18. A method of conveying an article, comprising:
    providing a guide rail along a tilted, curved section of a conveyor, the guide rail comprising at least one roller for providing low friction rolling contact to the article during conveyance by the conveyor.

19. The method of claim 15, further including halting the conveyance of the article on the conveyor while a conveyor belt supporting the article continues to move in a conveying direction.

* * * * *